(12) United States Patent
Bhargava et al.

(10) Patent No.: US 8,392,829 B2
(45) Date of Patent: Mar. 5, 2013

(54) MODULAR DOCUMENTATION USING A PLAYLIST MODEL

(75) Inventors: Renu Bhargava, Fremont, CA (US); Susan Aviva Doshay Garrett, Saratoga, CA (US); Christine Morrison Nay, San Francisco, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 568 days.

(21) Appl. No.: 12/651,348

(22) Filed: Dec. 31, 2009

(65) Prior Publication Data

US 2011/0161793 A1    Jun. 30, 2011

(51) Int. Cl.
*G06F 17/00* (2006.01)
(52) U.S. Cl. .......................... 715/255; 715/200
(58) Field of Classification Search .................. 715/200, 715/255
See application file for complete search history.

(56) References Cited

U.S. PATENT DOCUMENTS

| | | | | |
|---|---|---|---|---|
| 5,708,825 A * | 1/1998 | Sotomayor | .................... | 715/205 |
| 5,953,718 A * | 9/1999 | Wical | ..................... | 1/1 |
| 6,647,531 B2 * | 11/2003 | Isaac et al. | .................... | 715/273 |
| 7,043,698 B2 * | 5/2006 | Newbold | ....................... | 715/789 |
| 7,266,782 B2 * | 9/2007 | Hull et al. | ...................... | 715/838 |
| 7,451,395 B2 * | 11/2008 | Brants et al. | ................... | 715/254 |
| 8,245,135 B2 * | 8/2012 | Cai et al. | ....................... | 715/254 |
| 2001/0043364 A1 * | 11/2001 | Messner et al. | .............. | 358/1.15 |
| 2002/0097259 A1 * | 7/2002 | Marshall et al. | ............... | 345/738 |
| 2003/0014414 A1 * | 1/2003 | Newman | .......................... | 707/10 |
| 2005/0222989 A1 * | 10/2005 | Haveliwala et al. | .............. | 707/3 |
| 2006/0048042 A1 * | 3/2006 | Sembower et al. | ........... | 715/500 |
| 2006/0048053 A1 * | 3/2006 | Sembower et al. | ........... | 715/517 |
| 2007/0005646 A1 * | 1/2007 | Dumais et al. | .............. | 707/104.1 |
| 2007/0033213 A1 * | 2/2007 | Bezrukov et al. | ............. | 707/102 |
| 2009/0300051 A1 * | 12/2009 | Adams et al. | ................... | 707/102 |
| 2009/0307086 A1 * | 12/2009 | Adams et al. | ............... | 705/14.49 |
| 2010/0131455 A1 * | 5/2010 | Logan et al. | ................... | 707/602 |
| 2010/0228777 A1 * | 9/2010 | Imig et al. | ...................... | 707/772 |
| 2011/0047216 A1 * | 2/2011 | Stading et al. | ................. | 707/749 |
| 2011/0076664 A1 * | 3/2011 | Holt et al. | ...................... | 434/362 |
| 2012/0143681 A1 * | 6/2012 | Alcazar et al. | ............. | 705/14.49 |

OTHER PUBLICATIONS

Geffet et al., Hierarchical Indexing and Document Matching in BoW, ACM 2001, pp. 259-267.*
Rutledge et al., Structuring and Presenting Annotated Media Repositories, ACM 2004, pp. 466-467.*
Chung et al., Dynamic Topic Mining from News Stream Data, Google 2003, pp. 653-670.*
Yang et al., Using Wikipedia Technology for Topic Maps Design, ACM 2007, pp. 106-110.*
Dichew et al., View-Based Semantic Search and Browsing, IEEE 2006, pp. 1-7.*
Johnsen, Topic Maps, Journal of Information Architecture 2010, pp. 1-14.*

* cited by examiner

*Primary Examiner* — Cong-Lac Huynh
(74) *Attorney, Agent, or Firm* — Harrity & Harrity, LLP

(57) ABSTRACT

A server device receives modular topics, where each of the modular topics includes a machine-readable and machine-storable work product that includes information related to a single, stand-alone topic. The server device stores the modular topics in a content repository as a topic library. The server device receives selection of topics from the topic library to generate one or more customized pathway pages, where each of the customized pathway pages includes a plurality of links to ones of the stored modular topics. The server device enables access to the modular topics stored in the content repository via the generated one or more customized pathway pages.

20 Claims, 10 Drawing Sheets

MODULAR DOCUMENTATION USING A PLAYLIST MODEL

BACKGROUND

Technical documentation has typically been provided to users via reference books, user guides, instructional manuals and similar types of technical documentation. Technical documentation may be useful to individuals in learning technical information about, for example, technical subject matter, technical devices, etc. Technical documentation may be useful to inform individuals of technical specifications associated with a technical device, or about how to operate an apparatus or item of equipment. Technical documentation currently may be provided to individuals as hard copy books, guides or manuals, or as electronic copies of the books, guides or manuals. When technical documentation is provided in a book, guide, or manual format, readers of the technical documentation may have difficulty finding the information for which they are looking.

SUMMARY

In accordance with one embodiment, a method performed by one or more server devices may include receiving, by the one or more server devices, modular topics, where each of the modular topics includes a machine-readable and machine-storable work product that includes information related to a single, stand-alone topic. The method may further include storing the modular topics in a content repository as a topic library. The method may also include receiving selection of topics from the topics library to generate one or more customized pathway pages, where each of the customized pathway pages includes a plurality of links to ones of the stored modular topics. The method may additionally include enabling access to the modular topics stored in the content repository via the generated one or more customized pathway pages.

In another implementation, a server device may include a memory; and one or more processors to execute instructions stored in the memory to: receive modular topics, where each of the modular topics includes a machine-readable and machine-storable work product that includes information related to a single, stand-alone topic and where the stand-alone topic includes information that answers a question or provides details about a specific subject; store the modular topics in a content repository as a topic library; provide a user interface that permits selection of topics from the topics library, enabling a user to mix and match ones of the modular topics and to generate one or more customized pathway pages, where the customized pathway pages include links to the ones of the modular topics; and enable access to the modular topics stored in the content repository via the generated one or more customized pathway pages.

In yet another implementation, a computer-readable medium may include instructions executable by at least one processor. The computer-readable medium may include one or more instructions for storing modular topics in a content repository as a topic library, where each of the modular topics includes a machine-readable and machine-storable work product that includes information related to a single, stand-alone topic, and where the stand-alone topic includes information that answers a question or provides details about a specific subject; one or more instructions for receiving selection of topics from the topics library to generate one or more customized pathway pages, where each of the customized pathway pages includes a plurality of links to ones of the stored modular topics; and one or more instructions for enabling access to the modular topics stored in the content repository via the generated one or more customized pathway pages.

BRIEF DESCRIPTION OF THE DRAWINGS

The accompanying drawings, which are incorporated in and constitute a part of this specification, illustrate one or more embodiments described herein and, together with the description, explain the invention. In the drawings.

DETAILED DESCRIPTION

The following detailed description refers to the accompanying drawings. The same reference numbers may be used in different drawings to identify the same or similar elements. Also, the following detailed description does not limit the invention.

Exemplary embodiments described herein enable the provision of modular documentation (e.g., technical documentation) via customized pathway pages that can be generated for accessing topics in a modular fashion. Modular topics, with each modular topic being presented as, for example, a single Hypertext Markup Language (HTML) page, may be stored in a content repository as a topic library. A user interface may be used to select topics from the topic library and to organize access to the modular topics via customized pathway pages that include links to selected topics. A customized modular documentation preparer, using a "playlist" model, may create a list of modular topics that may be accessed via each pathway page. The customized modular documentation preparer may also, using a playlist model, create a list of modular topics that can be combined into a single electronic document called a topic collection (e.g., in a portable document format (PDF) or other electronic format that combines multiple modular topics) that may be accessed via a link inserted in a pathway page, or in a modular topic. The topic library, which stores the modular topics, may be used to create many different sets of customized modular documentation, or to easily modify an existing set of customized modular documentation.

The use of modular topics for creating customized modular documentation, as described herein, may allow scalable flexibility in reusing topics for different sets of customized modular documentation. The use of modular topics may further enable the mixing and matching of topics to suit the documentation needs of any user.

OVERVIEW

Figure 1:
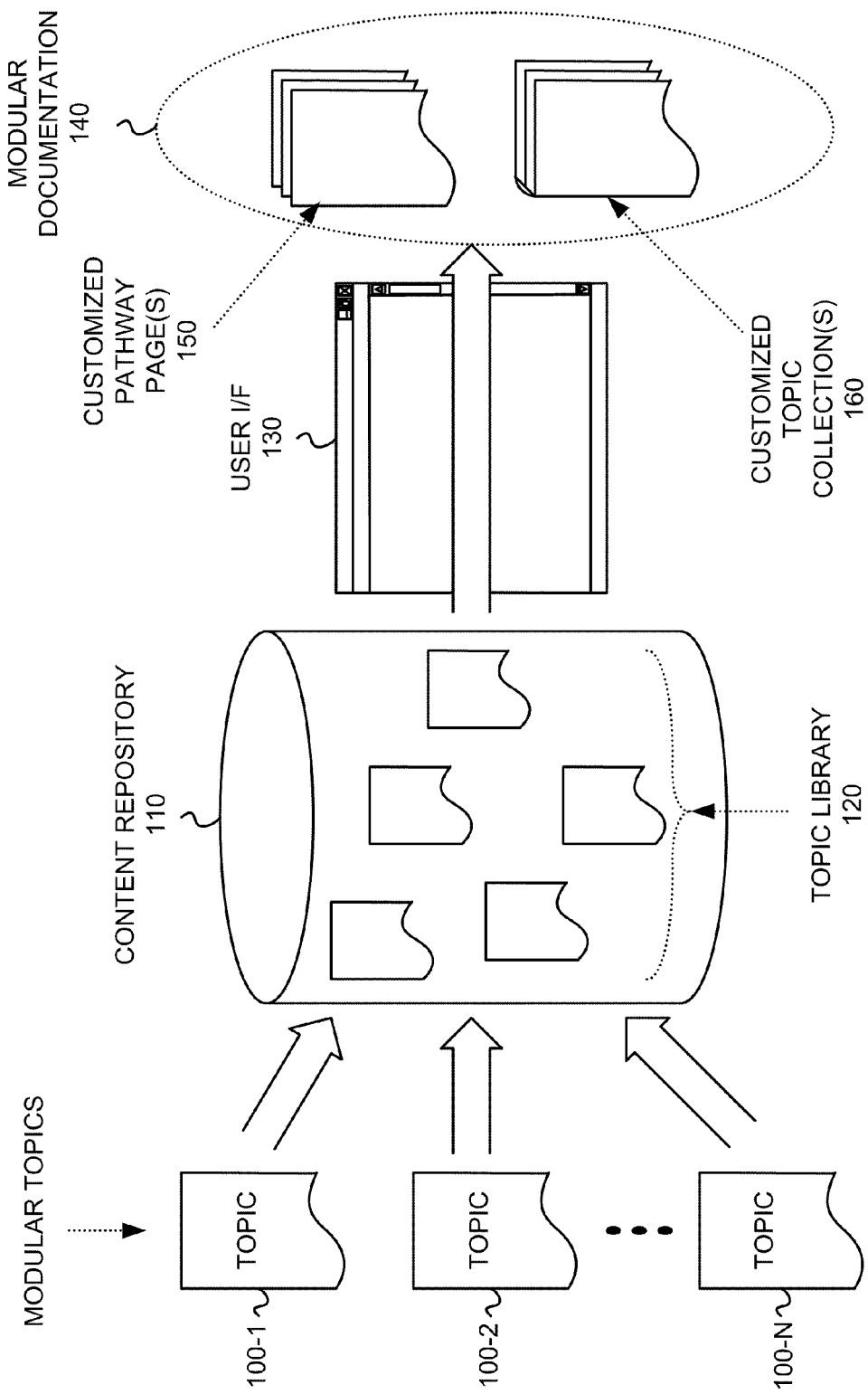
FIG. 1 is a diagram of an overview of using modular topics for providing customized modular documentation.

FIG. 1 is a diagram that depicts an overview of the use of modular topics for providing customized modular documentation. As shown in FIG. 1, multiple modular topics 100-1 through 100-N may be received and stored as a topic library 120 in a content repository 110. Each of modular topics 100-1 through 100-N may include a machine-readable and machine-storable work product that includes information related to a single, stand-alone topic. A stand-alone "topic" may include information that answers a question or provides details about a specific subject and which is complete in itself without the support of other topics. For example, each of topics 100-1 through 100-N may relate to a technical topic, such as a topic associated with a technical device, an apparatus, or an item of equipment. The machine-readable and machine-storable work product may include a page (e.g., a Hypertext Markup Language (HTML) page), a file, etc. Each modular topic 100 may, in one implementation, be presented as a single HTML page. Each modular topic 100 may additionally include metadata that may be used, for example, for enabling more relevant search results.

A user, using a user interface (I/F) 130, may access topic library 120, stored in content repository 110, to generate customized modular documentation 140 based on topics 100 of topic library 120. When creating customized modular documentation 140, the user may use user I/F 130 to generate one or more customized pathway pages 150 that include links to selected topics stored in content repository 110. The user may also use user I/F 130 to generate one or more customized topic collections 160 that include multiple topics bound together in a single "book-like" document (e.g., a single PDF document that aggregates multiple topics).

Figure 2A:
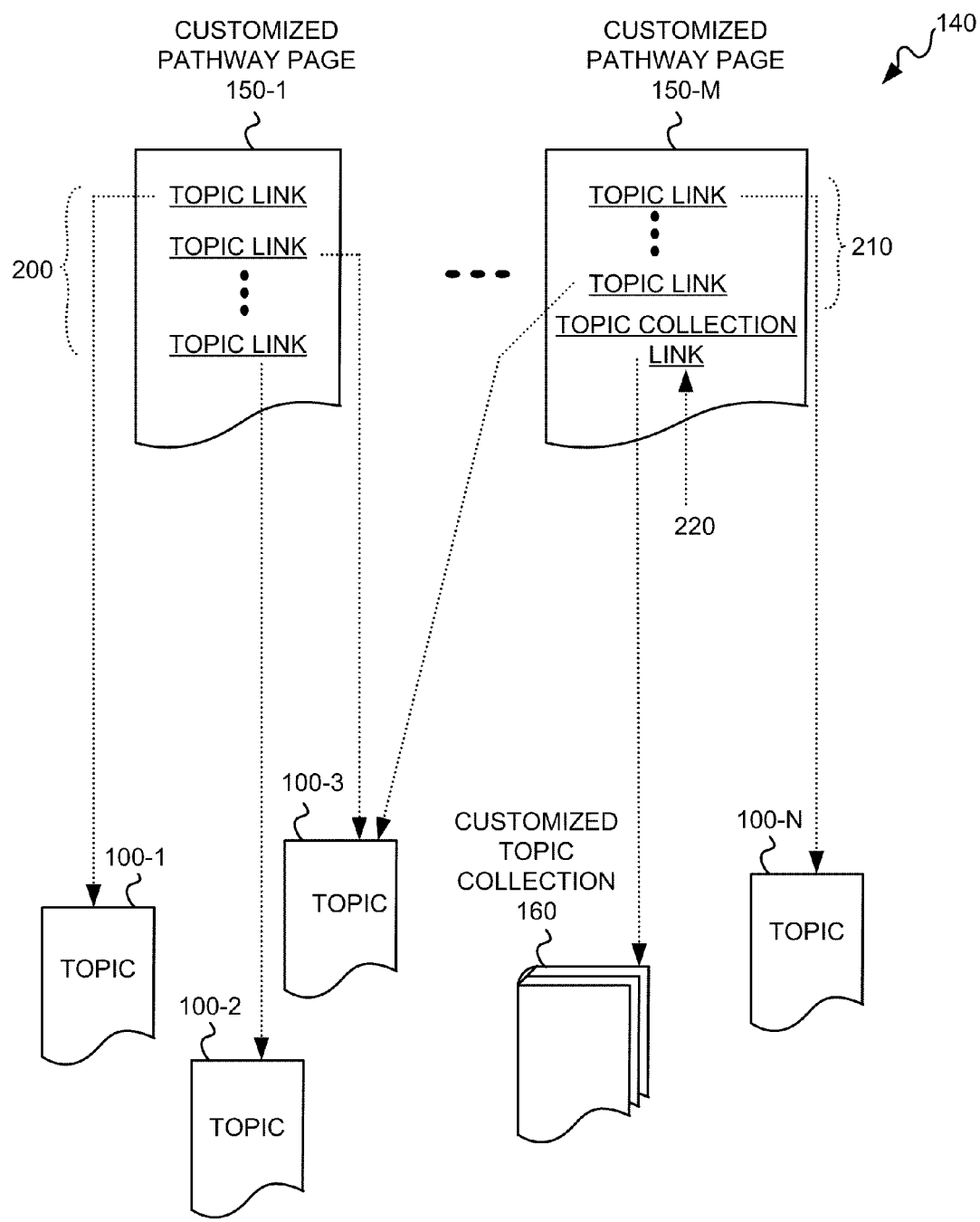
FIGS. 2A and 2B depict examples of using custom pathway pages and customized topic collections for accessing customized modular documentation.

FIG. 2A depicts an example of the use of custom pathway pages and customized topic collections for accessing modular topics. FIG. 2A depicts pathway pages 150-1 and 150-M that have been generated by user I/F 130. Pathway pages 150-1 and 150-M may include links to modular topics 100 or to customized topic collections 160. As shown, pathway page 150-1 may include multiple topic links 200, each of which provides a link to a respective modular topic 100-1, 100-2 and 100-3. A "link," as the term is used herein, is to be broadly interpreted to include any reference to/from a document from/to another document or another part of the same document. For example, a link may include an HTML link. Pathway page 150-M may include multiple topic links 210, each of which provides a link to a respective modular topic 100-3 and 100-N. Pathway page 150-M may additionally include a topic collection link 220 to a customized topic collection 160.

Figure 2B:
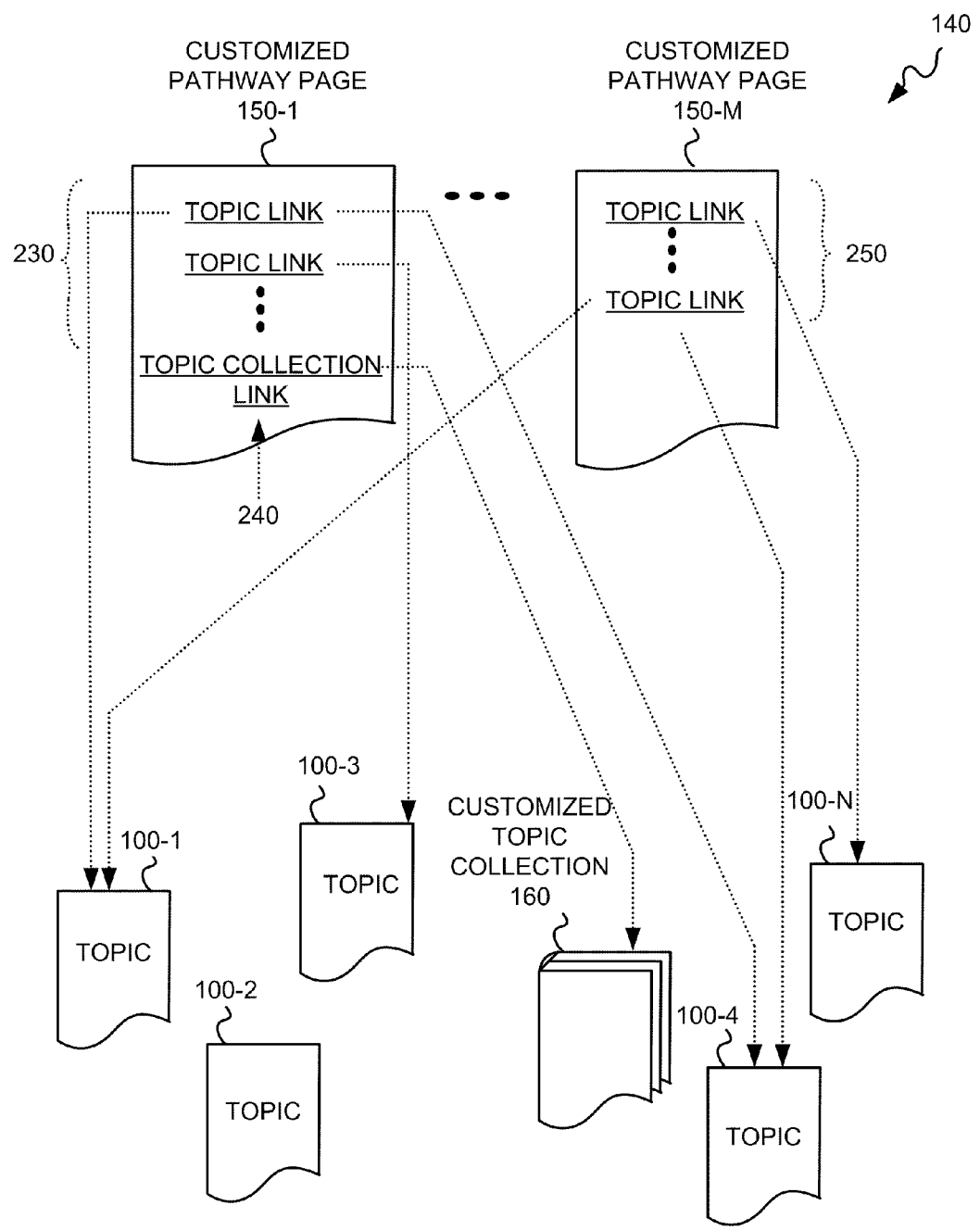

FIG. 2B depicts the example of FIG. 2A, where user I/F 130 has been used to change the links between pathway pages 150-1 and 150-M and modular topics 100 and/or customized topic collection 160. As shown, pathway page 150-1 now includes multiple topic links 230, each of which provides a link to a respective modular topic 100-1, 100-3, and 100-4. As can be seen in FIG. 2B, pathway page 150-1 now does not provide a link to modular topic 100-2. Pathway page 150-1 also now provides a topic collection link 240 to customized topic collection 160. As further shown in FIG. 2B, pathway page 150-M now includes multiple topic links 250, each of which provides a link to a respective modular topic 100-1, 100-4, and 100-N.

FIGS. 2A and 2B, therefore, depict one example in which user I/F 130 may be used to change links to topics and topic collections within pathway pages. Though not shown in FIGS. 2A and 2B, links to new modular topics and topic collections may be added to pathway pages 150-1 and 150-M.

EXEMPLARY NETWORK

Figure 3:
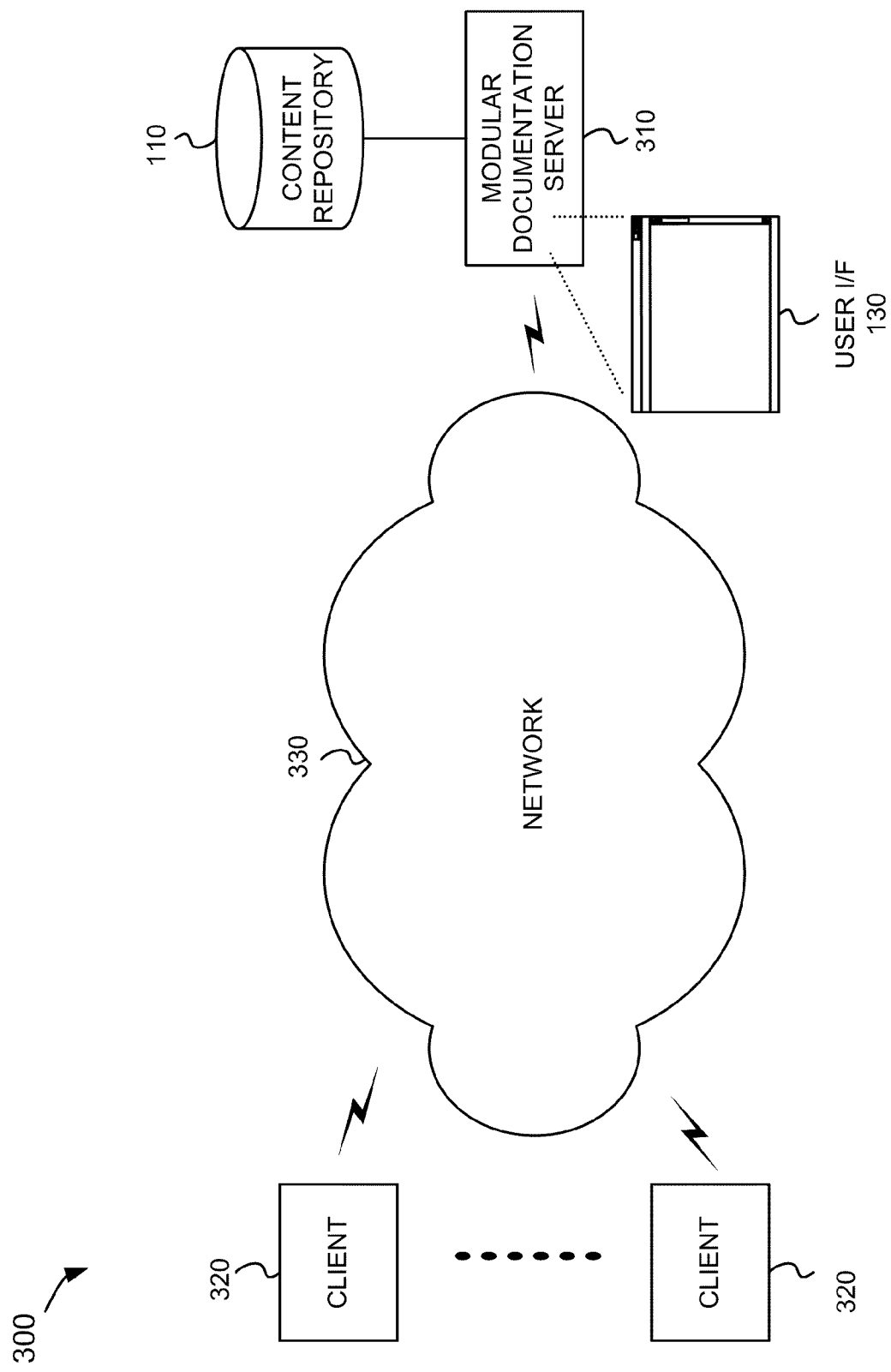
FIG. 3 is a diagram of an exemplary network in which exemplary embodiments associated with the use of customized modular documentation may be implemented.

FIG. 3 is a diagram of an exemplary network 300 in which exemplary embodiments associated with the use of customized modular documentation for providing customized content may be implemented. As shown, network 300 may include modular documentation server 310 and one or more clients 320 interconnected via a network 330. Components of network 300 may interconnect via wired and/or wireless connections. Network 300 also shows content repository 110 and user interface 130, which may include the features described above in connection with FIGS. 1, 2A, and/or 2B.

Modular documentation server 310 may include a server device that receives modular topics and stores them in content repository 110. Modular documentation server 310 may implement user I/F 130 to permit an administrator and/or other user to generate customized modular documentation based on the modular topics stored in content repository 110.

Clients 320 may each include a client device. A client device may include a personal computer, a wireless telephone, a personal digital assistant (PDA), a lap top computer, or another type of computation or communication device. Clients 320 may access the customized modular documentation provided by server 310.

Network 330 may include any type of network, such as a local area network (LAN), a wide area network (WAN), a telephone network (e.g., the Public Switched Telephone Network (PSTN) or a cellular network), an intranet, the Internet, or a combination of networks. Clients 320 and server 310 may connect to network 330 via wired and/or wireless connections.

The network components depicted in FIG. 3 are exemplary. Network 300 may include fewer, additional, or different network components than are shown in FIG. 3.

EXEMPLARY COMPONENTS OF SERVER

Figure 4:
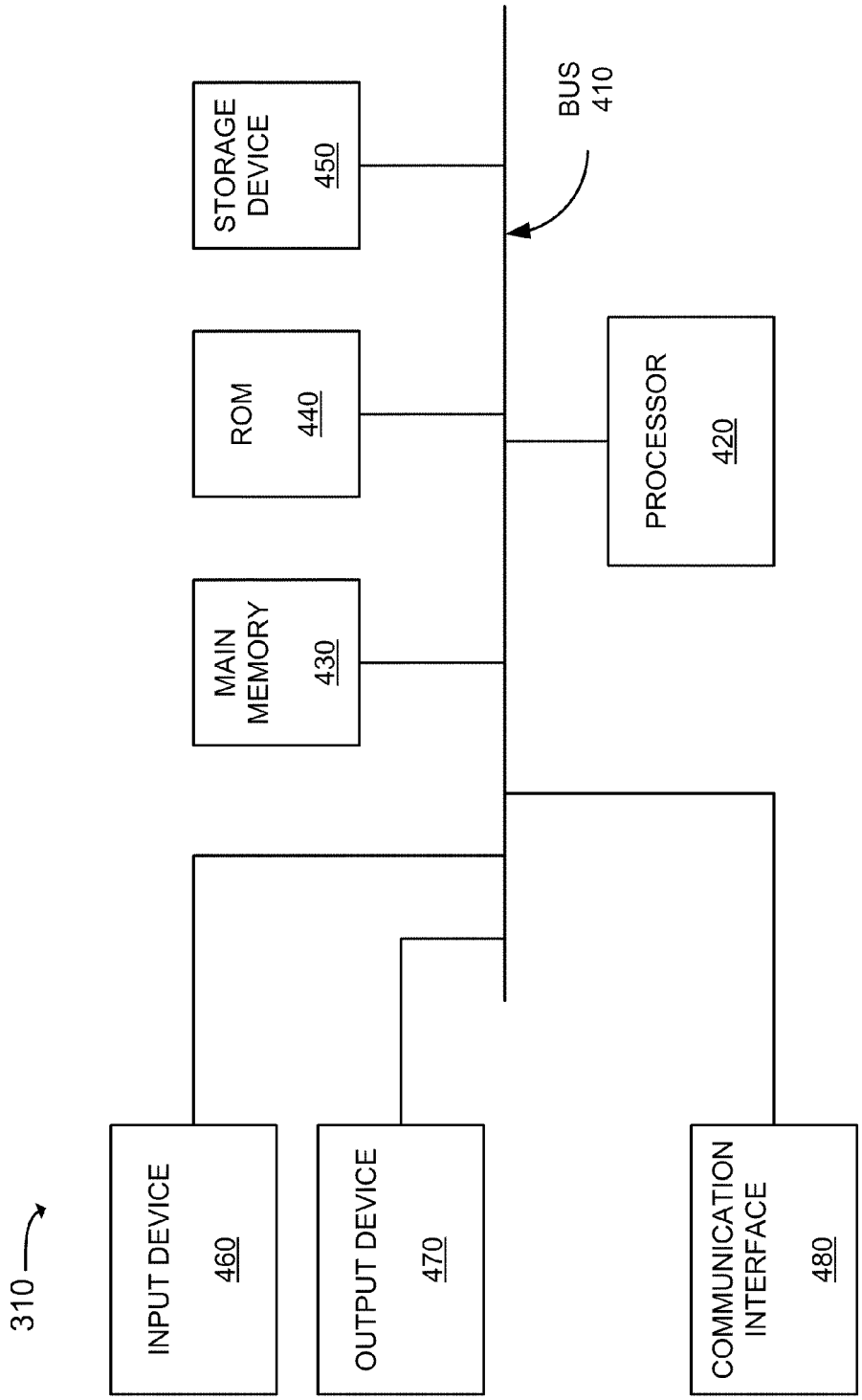
FIG. 4 is a diagram of exemplary components of the modular documentation server of FIG. 3.

FIG. 4 is a diagram of exemplary components of modular documentation server 310. As shown in FIG. 4, server 310 may include a bus 410, a processor 420, a main memory 430, a read only memory (ROM) 440, a storage device 450, an input device 460, an output device 470, and a communication interface 480. In another implementation, server 310 may include additional, fewer, different, or differently arranged components than are illustrated in FIG. 4.

Bus 410 may include a path that permits communication among the components of server 310. Processor 420 may include a processor, a microprocessor, or processing logic (e.g., an application specific integrated circuit (ASIC) or a field programmable gate array (FPGA)) that may interpret and execute instructions. Main memory 430 may include a random access memory (RAM) or another type of dynamic storage device that may store information and instructions for execution by processor 420. ROM 440 may include a ROM device or another type of static storage device that may store static information and instructions for use by processor 420. Storage device 450 may include a magnetic and/or optical recording medium and its corresponding drive, or a removable form of memory, such as a flash memory.

Input device 460 may include a mechanism that permits a user to input information to server 310, such as a keyboard, a mouse, a button, a pen, a touch screen, voice recognition and/or biometric mechanisms, etc. Output device 470 may include a mechanism that outputs information to the user, including a display, a light emitting diode (LED), a speaker, etc. Communication interface 480 may include any transceiver-like mechanism that enables server 310 to communicate with other devices and/or systems. For example, communication interface 480 may include mechanisms for communicating with another device or system via a network, such as network 330.

As will be described in detail below, server 310 may perform certain operations relating to generating customized modular documentation. Server 310 may perform these operations in response to processor 420 executing software instructions contained in a computer-readable medium, such as memory 430. A computer-readable medium may be defined as a logical or physical memory device. A logical memory device may include a space within a single physical memory device or spread across multiple physical memory devices.

The software instructions may be read into memory 430 from another computer-readable medium, such as storage device 450, or from another device via communication interface 380. The software instructions contained in memory 430 may cause processor 420 to perform processes that will be described later. Alternatively, hardwired circuitry may be used in place of or in combination with software instructions to implement processes described herein. Thus, implementations described herein are not limited to any specific combination of hardware circuitry and software.

The components of modular documentation server 310 depicted in FIG. 4 are exemplary. Modular documentation server 310 may include fewer, additional, different and/or differently arranged components than are shown in FIG. 4.

EXEMPLARY CONTENT REPOSITORY

Figure 5:
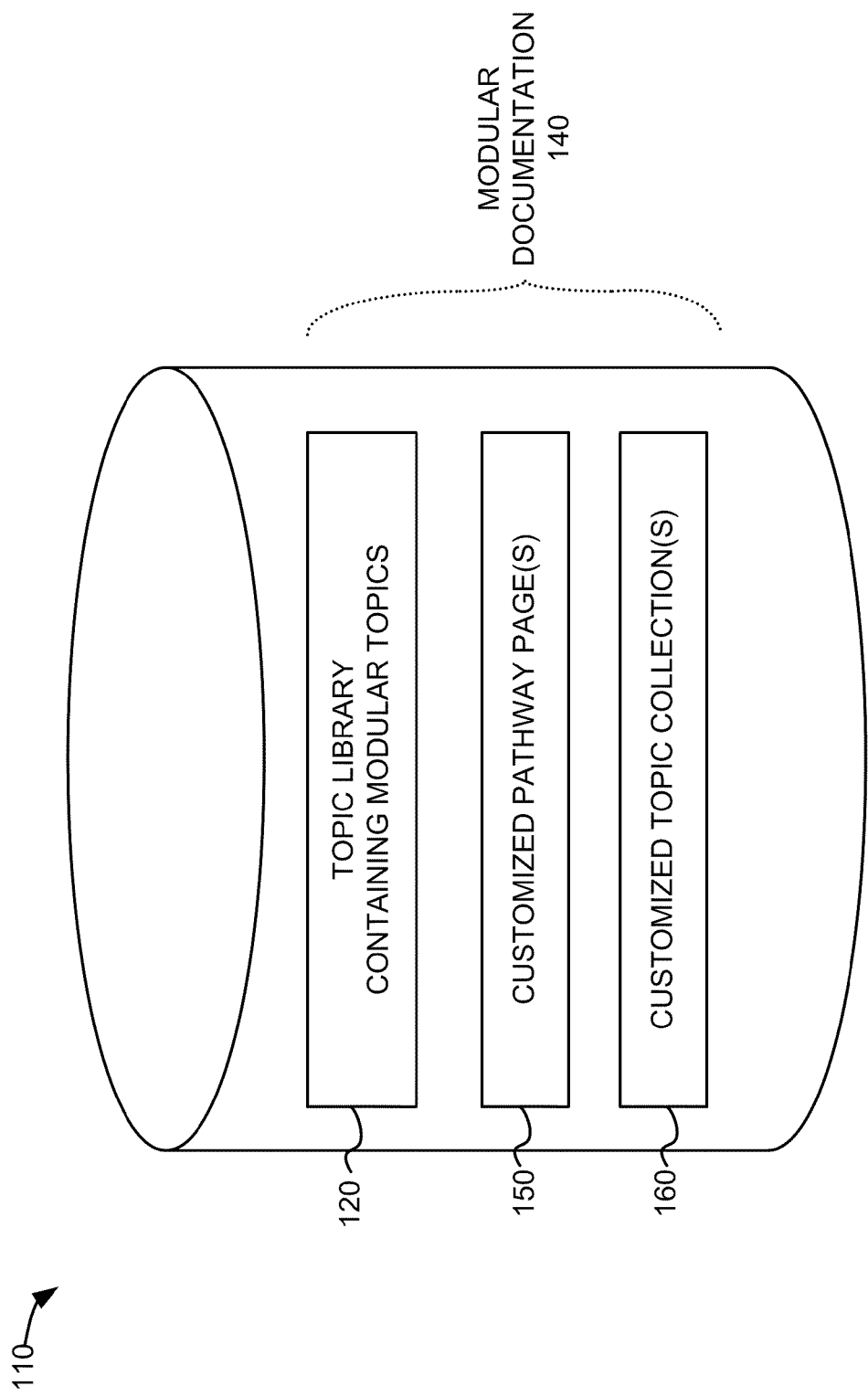
FIG. 5 is a diagram of an exemplary content repository for storing modular topics, pathway pages, and topic collections.

FIG. 5 is a diagram of an exemplary content repository 110 for storing modular documentation 140. Content repository 110 may be implemented as a database, or as another type of data structure. Modular documentation 140 may include topic library 120 (e.g. containing modular topics), customized pathway pages 150, and/or customized topic collections 160.

Topic library 120 may store modular topics 100 (described above). Customized pathway page(s) 150 may store one or more pages generated by customized selection of modular topics 100 from topic library 120, where each pathway page includes links to ones of modular topics 100. Customized pathway pages 150 are described further below. Customized topic collection(s) 160 may store multiple topics bound together in a single "book-like" document (e.g., in a single PDF document, or other electronic format, that aggregates multiple topics).

EXEMPLARY PROCESS

Figure 6:
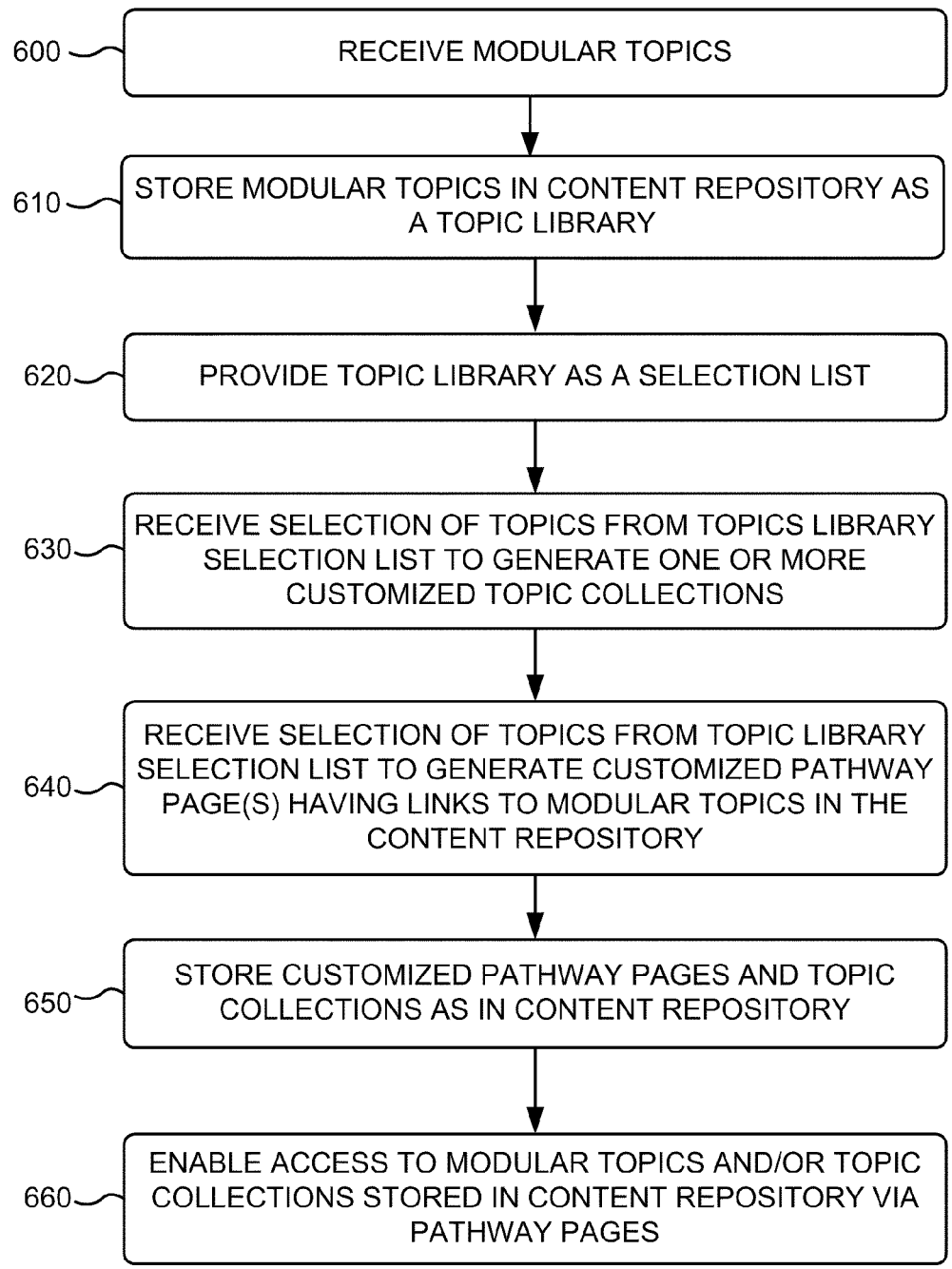
FIG. 6 is a flow chart that illustrates an exemplary process for receiving modular topics and for generating customized pathway pages and customized topic collections to enable users to access the modular topics.

FIG. 6 is a flow chart that illustrates an exemplary process for receiving modular topics and for generating customized pathway pages and customized topic collections to enable users to access the modular topics. The exemplary process of FIG. 6 may be implemented by modular documentation server 310. In other embodiments, some or all of the blocks described below may be performed by one or more other devices of network 300, or by a device not shown in FIG. 3.

The exemplary process may include receiving modular topics (block 600). An administrator, or other user, may upload modular topics to modular documentation server 310. The modular topics may each include a machine-readable and machine-storable work product that includes information related to a single, stand-alone topic. A stand-alone "topic" may include information that answers a question or provides details about a specific subject and which is complete in itself without the support of other topics. For example, each modular topic may relate to a technical topic, such as a topic associated with a technical device, an apparatus or an item of equipment. In one implementation, the machine-readable and machine-storable work product may include a page (e.g., a Hypertext Markup Language (HTML) page), a file, etc., and, therefore, each modular topic may be presented as a single HTML page.

Figure 7:
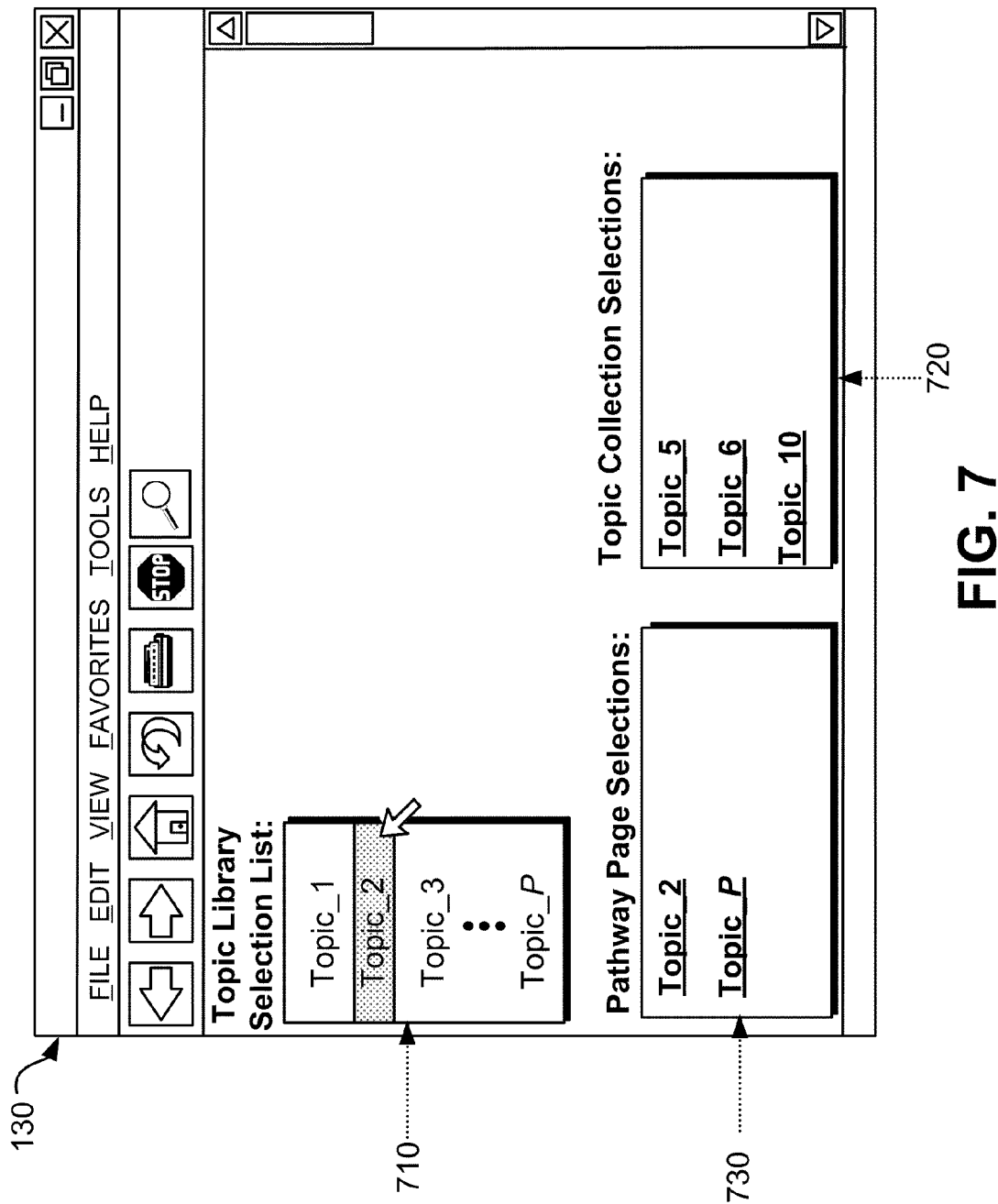
FIG. 7 is a diagram of an exemplary user interface that may be used to generate customized pathway pages and customized topic collections to enable access to customized modular documentation.

The received modular topics may be stored in content repository 110 as a topic library (block 610). Modular documentation server 310 may receive the uploaded modular topics and may store them in the data structure (e.g., database) of content repository 110. The topic library may be provided as a selection list (block 620). For example, user I/F 130 may present the modular topics stored in the topic library of content repository 110 as a selection list, from which modular topics may be mixed and matched to build a customized "playlist" of topics. This playlist may be used to create either a pathway page or a topic collection. FIG. 7 depicts an example of user I/F 130 which presents a topic library selection list 710 from which a user may select modular topics for inclusion in a pathway page or a topic collection.

As further shown in FIG. 6, a selection of topics from the topics library selection list may be received to generate one or more customized topic collections (block 630). As shown in FIG. 7, topics from topic library selection list 710 may be selected to populate a topic collection selection list 720. Topic collection selection list 720 may be used to generate a customized topic collection that includes multiple topics bound together in a single "book-like" document (e.g., in a single PDF document that aggregates multiple topics). Therefore, for each topic collection that a user desires to create, the user may select modular topics from topic library selection list 710 to populate a corresponding topic collection selections list 720 that can be used to generate the topic collection.

Returning to FIG. 6, a selection of topics from the topics library selection list may be received to generate one or more customized pathway pages having links to modular topics in content repository 110 (block 640). As shown in FIG. 7, topics from topic library selection list 710 may be selected to populate a pathway page selection list 730. Pathway page selection list 730 may be used to generate a customized pathway page that includes links to the topics selected from topic library selection list 710. Therefore, for each customized pathway page a user desires to create, the user may select modular topics from topic library selection list 710 to populate a corresponding pathway page selection list 730 that can be used to generate a pathway page that includes links to the topics contained in topic library selection list 710.

As further shown in FIG. 6, the generated customized pathway pages and topic collections may be stored in content repository 110 (block 650). The customized pathway page(s) generated in block 640 may be stored in the data structure of content repository 110 as customized pathway page(s) 150. The topic collection(s) generated in block 630 may be stored in the data structure of content repository 110 as customized topic collections 160.

Figure 8:
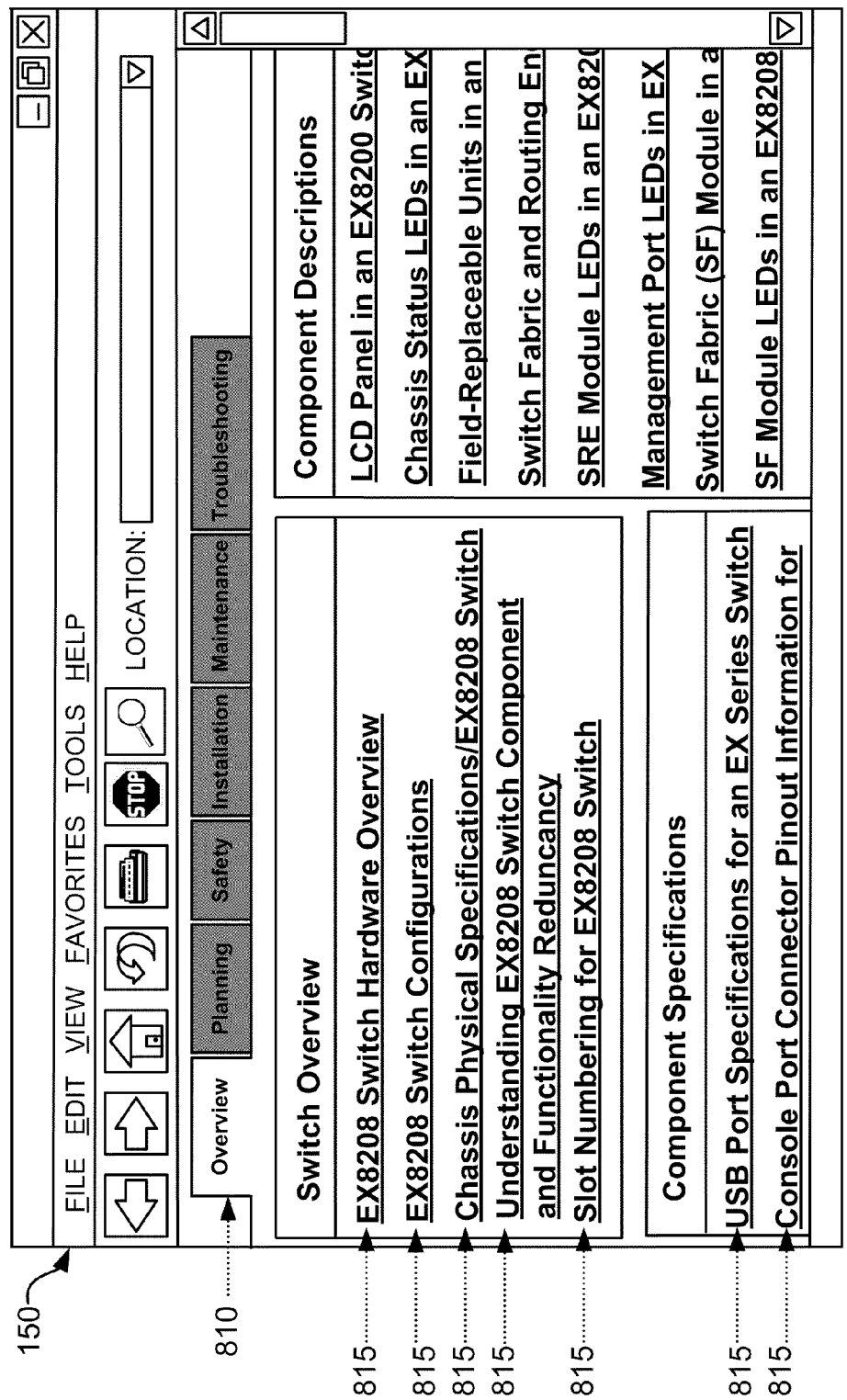
FIG. 8 is a diagram of an example of a customized path page that includes links for accessing modular topics.
Figure 9:
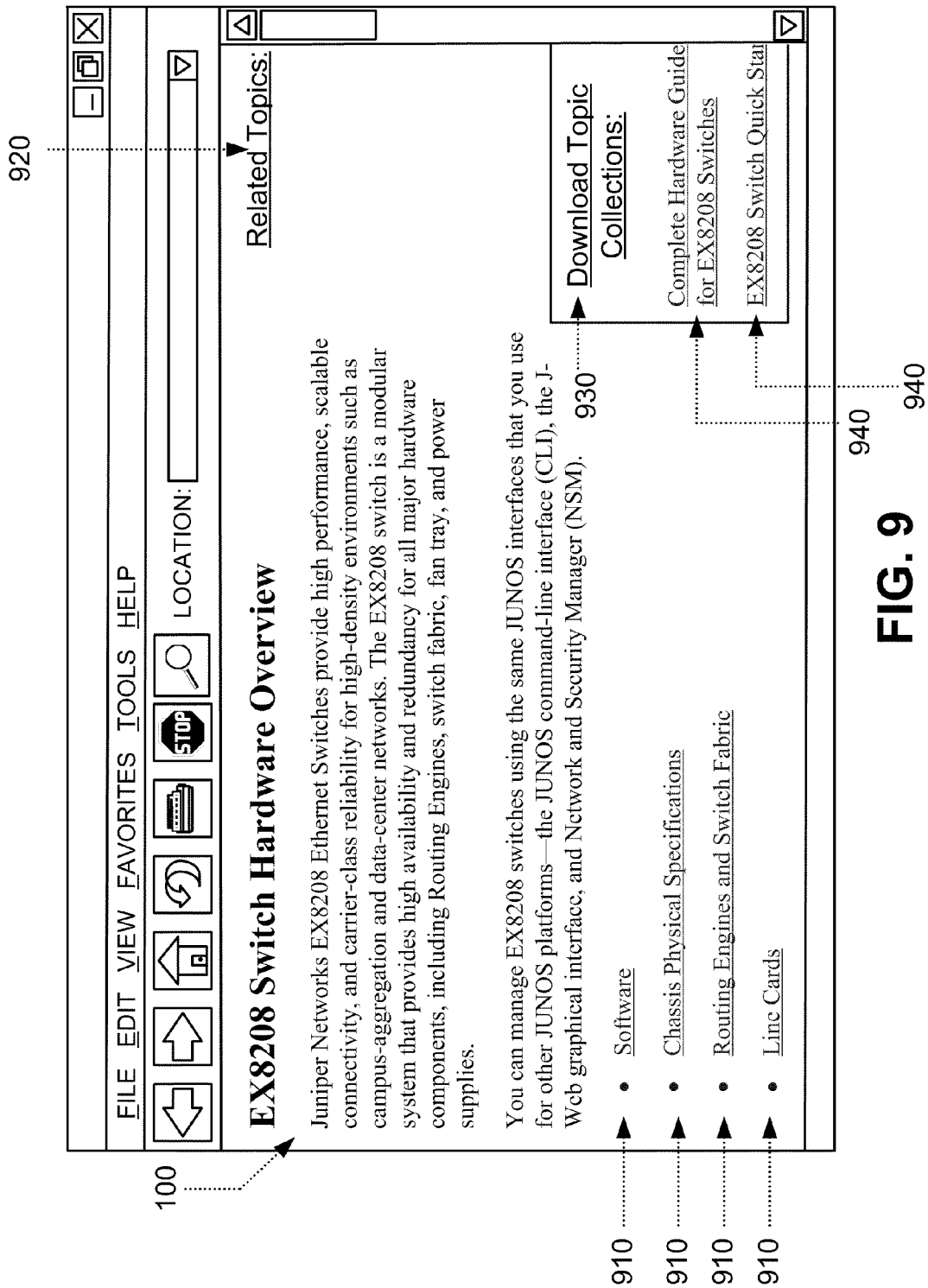
FIG. 9 is a diagram of an example of a modular topic that may be accessed via a link contained in the pathway page of FIG. 7.

Access to the modular topics and/or topic collections stored in content repository 110 may be enabled via the generated pathway pages (block 660). Modular documentation server 310 may permit clients 320 to access one or more of customized pathway pages 150 in content repository 110 to further access modular topics via links contained in customized pathway pages 150. For example, as shown in FIG. 8, a user may access a customized pathway page 150 to further access a tabbed menu 810. Tabbed menu 810 may permit the user to select different categories of topics associated with a subject (e.g., overview, planning, safety, installation, maintenance, and troubleshooting subjects) and to access links 815 to modular topics stored in content repository 110. Upon selection of any link 815 on pathway page 150 of FIG. 8, a corresponding modular topic 100 may be accessed and presented, as further shown in FIG. 9. Modular topic 100 may be presented as single HTML page, and may include the content related to the topic. Modular topic 100 may further include links 910 to other modular topics that may represent subtopics (or related topics) of modular topic 100. Modular topic 100 may also include a link(s) 920 to a topic(s) that is related to modular topic 100, and may further include one or more links 940 to downloadable topic collections 930.

As described above with respect to FIGS. 2A and 2B, customized pathway pages and topic collections, generated using the exemplary process of FIG. 6, may be modified, using user I/F 130, to change the links (i.e., add links, remove links, and/or replace links) contained in the pathway pages, or to change the modular topics (add, remove, or replace modular topics) collected in a topic collection.

CONCLUSION

As described herein, customized modular documentation may use pathway pages for accessing topics in a modular fashion. The modular topics may be stored as a topic library and a user interface may be used, via selection of topics from the topic library, to organize access to the modular topics via customized pathway pages that include links to selected topics. A customized modular documentation preparer, using a selection list, may build a "playlist" of modular topics that may be accessed via a pathway page. The customized modular documentation preparer may also, using the selection list, build a playlist of modular topics that can be combined into a single electronic document called a topic collection (e.g., a PDF or other electronic format that combines multiple modular topics) that may be accessed via a link inserted in a pathway page, or in a modular topic.

The foregoing description of embodiments described herein provides illustration and description, but is not intended to be exhaustive or to limit the embodiments described herein to the precise form disclosed. Modifications and variations are possible in light of the above teachings or may be acquired from practice of the invention.

While a series of blocks has been described in FIG. 6, the order of the blocks may vary in other implementations. Also, non-dependent blocks may be performed in parallel. Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed:

1. A method comprising:
   receiving, by one or more server devices, a selection of topics, each of the topics including information regarding different subject matter;
   generating, by the one or more server devices and based on the selected topics, one or more collections of topics, each of the one or more collections of topics including a respective plurality of topics, of the selected topics, that are aggregated based on the subject matter associated with each of the respective plurality of topics;
   generating, by the one or more server devices and based on the selected topics, one or more pages, each of the one or more pages including at least one link to the respective plurality of topics and at least one link to the one or more collection of topics; and
   storing, by the one or more server devices, the one or more collections of topics and the one or more pages.

2. The method of claim 1, further comprising:
   receiving a selection of the one or more pages;
   providing, for display, a menu including information regarding one or more categories associated with the plurality of topics;
   receiving a selection, using the menu, of the one of the one or more categories; and
   providing, for display, information associated with the selected one of the one or more categories.

3. The method of claim 2, where the information associated with the selected one of the one or more categories includes the at least one link to a topic, of the respective plurality of topics, the method further comprising:
   receiving a selection of a link, of the at least one link; and
   providing, for display, a document including content associated with the selected link.

4. The method of claim 3, where the document includes a plurality of other links, each of the plurality of other links being associated with one or more other topics, of the respective plurality of topics, the method further comprising:
   providing, for display, the document and the plurality of other links.

5. The method of claim 3, where the document includes another link, the other link being associated with another topic, of the respective plurality of topics, the other topic being related to the topic, the method further comprising:
   providing, for display, the document and the link to the other, related topic.

6. The method of claim 3, where the document includes one or more links to the one or more collections of topics, the method further comprising:
   providing, for display, the document and the link to the other, related topic and the one or more links to the one or more collections of topics.

7. The method of claim 3, where the document is a Hypertext Markup Language (HTML) page.

8. The method of claim 1, where the selection of the topics is based on information received from a user.

9. A device comprising:
   a memory; and
   one or more processors to execute instructions stored in the memory to:
     receive a selection of topics, each of the topics including information regarding different subject matter
     generate, based on the selected topics, one or more collections of topics, each of the one or more collections of topics including a respective plurality of topics, of the selected topics, that are aggregated based on the subject matter associated with each of the respective plurality of topics;

generate, based on the selected topics, one or more pages, each of the one or more pages including at least one link to the respective plurality of topics and at least one link to the one or more collection of topics, and store the more collections of topics and the one or more pages.

10. The device of claim 9, where the one or more processors are further to execute the instructions stored in the memory to:

receive a selection of the one or more pages;

provide, for display, a menu including information regarding one or more categories associated with the plurality of topics;

receive a selection, using the menu, of the one of the one or more categories;

provide, for display, information associated with the selected one of the one or more categories, the information associated with the selected one of the one or more categories including the at least one link to a topic, of the respective plurality of topics;

receive a selection of a link, of the at least one link; and provide, for display, a document including content associated with the selected link.

11. The device of claim 10, where the document includes a plurality of other links, each of the plurality of other links being associated with one or more other topics, of the respective plurality of topics and the one or more processors are further to execute the instructions in the memory to:

provide, for display, the document and the plurality of other links.

12. The device of claim 10, where the document includes another link, the other link being associated with another topic, of the respective plurality of topics, the other topic being related to the topic and the one or more processors are further to execute the instructions in the memory to:

provide, for display, the document and the link to the other, related topic.

13. The device of claim 10, where the document includes one or more links to the one or more collections of topics and the one or more processors are further to execute the instructions to:

provide, for display, the document and the link to the other, related topic and the one or more links to the one or more collections of topics.

14. The device of claim 10, where the document is a Hypertext Markup Language (HTML) page.

15. A non-transitory computer-readable medium comprising:

one or more instructions which, when executed by at least one processor, cause the at least one processor to:

receive a selection of topics, each of the topics including information regarding different subject matter;

generate, based on the selected topics, one or more collections of topics, each of the one or more collections of topics including a respective plurality of topics, of the selected topics, that are aggregated based on the subject matter associated with each of the respective plurality of topics;

generate, and based on the selected topics, one or more pages each of the one or more pages including at least one link to the respective plurality of topics and at least one link to the one or more collection of topics; and store the one or more collections of topics and the one or more pages.

16. The computer-readable medium of claim 15, further comprising:

one or more instructions to receive a selection of the one or more pages;

one or more instructions to provide, for display, a menu including information regarding one or more categories associated with the plurality of topics;

one or more instructions to receive a selection, using the menu, of the one of the one or more categories; and one or more instructions to provide, for display, information associated with the selected one of the one or more categories.

17. The computer-readable medium of claim 16, where the information associated with the selected one of the one or more categories includes the at least one link to a topic, of the respective plurality of topics, the medium further comprising:

one or more instructions to receive a selection of a link, of the at least one link; and one or more instructions to provide, for display, a document including content associated with the selected link.

18. The computer-readable medium of claim 17, where the document includes a plurality of other links, each of the plurality of other links being associated with one or more other topics, of the respective plurality of topics, the medium further comprising:

one or more instructions to provide, for display, the document and the plurality of other links.

19. The computer-readable medium of claim 17, where the document includes another link, the other link being associated with another topic, of the respective plurality of topics, the other topic being related to the topic, the medium further comprising:

one or more instructions to provide, for display, the document and the link to the other, related topic.

20. The computer-readable medium of claim 17, where the document includes one or more links to the one or more collections of topics, the medium further comprising:

one or more instructions to provide, for display, the document and the link to the other, related topic and the one or more links to the one or more collections of topics.

* * * * *

UNITED STATES PATENT AND TRADEMARK OFFICE
CERTIFICATE OF CORRECTION

| | |
|---|---|
| PATENT NO. | : 8,392,829 B2 |
| APPLICATION NO. | : 12/651348 |
| DATED | : March 5, 2013 |
| INVENTOR(S) | : Renu Bhargava et al. |

It is certified that error appears in the above-identified patent and that said Letters Patent is hereby corrected as shown below:

In the Claims:

Column 8, claim 9, line 65 should read: "information regarding different subject matter,"

Signed and Sealed this
Fourteenth Day of May, 2013

Teresa Stanek Rea
*Acting Director of the United States Patent and Trademark Office*